(12) United States Patent
Qi (10) Patent No.: US 12,455,445 B2
(45) Date of Patent: Oct. 28, 2025

(54) ADAPTIVE HEADS-UP DISPLAY USING A USER MONITORING SYSTEM AND REMOTE SYSTEMS

(71) Applicant: GM Global Technology Operations LLC, Detroit, MI (US)

(72) Inventor: Wenyuan Qi, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 18/156,134

(22) Filed: Jan. 18, 2023

(65) Prior Publication Data

US 2024/0201489 A1    Jun. 20, 2024

(30) Foreign Application Priority Data

Dec. 15, 2022  (CN) .......................... 202211618655.6

(51) Int. Cl.
```
G02B 27/00    (2006.01)
G02B 27/01    (2006.01)
B60K 35/23    (2024.01)
B60K 35/60    (2024.01)
B60K 35/65    (2024.01)
B60K 35/81    (2024.01)
```
(52) U.S. Cl.
CPC ..... *G02B 27/0093* (2013.01); *G02B 27/0101* (2013.01); *B60K 35/23* (2024.01); *B60K 35/60* (2024.01); *B60K 35/654* (2024.01); *B60K 35/81* (2024.01); *B60K 2360/334* (2024.01); *G02B 2027/0138* (2013.01); *G02B 2027/014* (2013.01); *G02B 2207/101* (2013.01)

(58) Field of Classification Search
CPC ..................... B60W 2050/146; G02B 27/0093
See application file for complete search history.

(56) References Cited

U.S. PATENT DOCUMENTS

| | | | |
|---|---|---|---|
| 9,457,914 B1* | 10/2016 | Cline | B64D 45/00 |
| 10,228,260 B2* | 3/2019 | Swaminathan | H04W 4/44 |
| 10,423,292 B2* | 9/2019 | Chan | H04L 51/046 |
| 10,893,010 B1* | 1/2021 | Argenti | G08G 1/093 |
| 11,093,767 B1* | 8/2021 | Argenti | B60W 40/09 |
| 12,039,899 B1* | 7/2024 | Rajavenkatanarayanan | B60K 35/10 |
| 2012/0323933 A1* | 12/2012 | He | H04L 51/224 707/E17.005 |

(Continued)

FOREIGN PATENT DOCUMENTS

EP    3125018 A1 *    2/2017    .............. G02B 30/27

*Primary Examiner* — Rhonda S Peace
(74) *Attorney, Agent, or Firm* — Vivacqua Crane, PLLC (57) ABSTRACT

Methods and systems for a vehicle for adaptively controlling messages displayed on a heads-up display. A plurality of requests is received by a first controller to display a message associated with each of the plurality of requests on a heads-up display from one or more operational applications. The plurality of requests are filtered by an arbitration gateway based on user attention data gathered from a user monitoring system and a user behavior history. A priority is assigned to each of the plurality of filtered requests based on a user interest prediction model, at least a portion of the plurality of the filtered requests are selected based on the assigned priority, and the messages associated with the selected portion of the plurality of filtered requests are displayed on the heads-up display.

20 Claims, 4 Drawing Sheets

(56) References Cited

U.S. PATENT DOCUMENTS

| | | | |
|---|---|---|---|
| 2013/0076787 A1* | 3/2013 | Mathieu | B60K 35/29 |
| | | | 345/633 |
| 2015/0281162 A1* | 10/2015 | Shen | G10L 15/1822 |
| | | | 709/206 |
| 2021/0011287 A1* | 1/2021 | King | G03B 21/145 |
| 2021/0055547 A1* | 2/2021 | Rao | G09G 3/36 |
| 2024/0132096 A1* | 4/2024 | Landry | B60Q 9/00 |
| 2024/0201489 A1* | 6/2024 | Qi | B60K 35/10 |

* cited by examiner

ADAPTIVE HEADS-UP DISPLAY USING A USER MONITORING SYSTEM AND REMOTE SYSTEMS

BACKGROUND

A heads-up display is a transparent display that provides information to a driver while allowing the driver to maintain their gaze toward the road, minimizing driver distraction. Generally, heads-up displays utilize a projector to project images onto the windshield or other transparent screen within the driver's field of vision while gazing at the roadway. In aspects, the windshield, or screen, includes a phosphor material that is activated by a beam of light or a reflective mirror to display projected images. A number of heads-up displays include augmented reality, where information is projected onto the display and overlays, or is combined with, features in the environment visible through the windshield or transparent screen. Heads-up display systems project data gathered from, body electronics such as the speedometer or tachometer, navigation systems, infotainment systems and other on-board or remote systems. For example, a heads-display may provide a driver with information regarding the status of the vehicle such as the vehicle speed, engine rotations per minute, battery charging, or applications running on infotainment systems such as maps or playing media.

Thus, while heads-up displays achieve their intended purpose, room remains for improvement in displaying information on heads-up displays.

SUMMARY

According to several aspects, the present disclosure relates to a method of adaptively controlling messages displayed on a heads-up display. The method includes receiving a plurality of requests to display a message associated with each of the plurality of requests on a heads-up display from one or more operational applications. The method further includes filtering the plurality of requests by an arbitration gateway based on user attention data gathered from a user monitoring system and a user behavior history. In addition, the method includes assigning a priority to each of the plurality of filtered requests based on a user interest prediction model, selecting at least a portion of the plurality of the filtered requests based on the assigned priority, and displaying the messages associated with the selected portion of the plurality of filtered requests on the heads-up display.

In embodiments, the method includes dropping the message associated with at least one of the plurality of filtered requests that was not selected based on the assigned priority. In further embodiments, the method includes displaying the dropped message associated with at least one of the plurality of filtered requests on the heads-up display that was not selected based on the assigned priority. In additional further embodiments, the method includes providing at least one of a sound and a haptic response when the dropped message is related to safety.

In additional embodiments, the method includes gathering user attention data using an attention sensor. The attention sensor may include at least one of a time-of-flight sensor and a camera.

In any of the above embodiments, the method further includes calculating the user interest prediction model based upon a surrounding environmental event and the user behavior history.

In any of the above embodiments, the method further includes filtering the plurality of requests by calculating a filtering tuple for each of the plurality of requests. In further embodiments, the method includes calculating the filtering tuple by characterizing each of the plurality of requests according to the following elements: an ID, a priority, an emergency level, a user attention status, a user behavior history, a heads-up display attribute, and raw data. In yet further embodiments, the method includes assigning the priority of each of the plurality of filtered requests by weighting the filtering tuple for each of the plurality of filtered requests, weighting a prioritizing tuple for each of the plurality of filtered requests, and adding the weighted filtering tuple and the weighted prioritizing tuple. In additional further embodiments, the method further includes calculating the prioritizing tuple by characterizing each of the plurality of requests according to the following elements: an event_ID, a priority, an emergency level, a predictive user interest, a heads-up display attribute, a lead time, and raw event data.

According to several additional aspects, the present disclosure also relates to an on-board adaptive heads-up display system for a vehicle. The on-board adaptive heads-up display system includes a first controller, a heads-up display connected to the first controller, and a user monitoring system connected to the first controller. The first controller is configured to execute instructions to perform the method according to any of the above-described embodiments of adaptively controlling messages displayed on a heads-up display. The first controller is configured to execute instructions to receive a plurality of requests to display a message associated with each of the plurality of requests on a heads-up display from one or more operational applications and filter the plurality of requests by an arbitration gateway based on user attention data gathered from the user monitoring system and a user behavior history. The first controller is further configured to execute instructions to assign a priority to each of the plurality of filtered requests based on a user interest prediction model, select at least a portion of the plurality of the filtered requests based on the assigned priority, and display the messages associated with the selected portion of the plurality of the filtered requests on the heads-up display. In further embodiments, the controller is also configured to execute instructions to drop the message associated with the at least one of the plurality of filtered requests that was not selected based on the assigned priority. In yet further embodiments, the controller is also configured to execute instructions to provide at least one of a sound and a haptic response when the dropped message is related to safety.

In any of the above embodiments, the controller is further configured to gather user attention data using an attention sensor, wherein the attention sensor includes at least one of a time-of-flight sensor and a camera. In further embodiments, the controller is configured to execute instructions to configure a heads-up display attribute of the messages using user inputs received from a user input device.

In any of the above embodiments, the controller is further configured to execute instructions to filter the plurality of requests using a filtering tuple to characterize each of the plurality of requests by the arbitration gateway including the following elements: an ID, a priority, an emergency level, a user attention status, a user behavior history, a heads-up display attributes, and raw data. In further embodiments, the controller is configured to execute instructions to assign a priority to the plurality of filtered requests by weighting the filtering tuple for each of the plurality of filtered requests;

weighting a prioritizing tuple based on the user interest prediction model; and adding the weighted filtering tuple and the weighted prioritizing tuple to calculate a prioritizing score. In yet further embodiments, controller is configured to execute instructions to calculate the prioritizing tuple by characterizing each of the plurality of filtered requests according to the following elements: an event_ID, a priority, an emergency level, a predictive user interest, a heads-up display attribute, a lead time, and raw event data.

According to several additional aspects, the present disclosure also relates to an adaptive heads-up display system for a vehicle. The system includes an on-board adaptive heads-up display system including a first controller, a heads-up display connected the first controller, a user monitoring system connected to the first controller, and a first communication system connected to the first controller. The system further includes a remote system. The remote system includes a remote controller and a remote communication system connected to the remote controller. The remote controller is configured to wirelessly communicate information to the first communication system. The first controller is configured to execute instructions to execute the method of any of the above-described embodiments of adaptively controlling messages displayed on a heads-up display. The first controller is configured to receive a plurality of requests to display a message associated with each of the plurality of requests on a heads-up display from one or more operational applications and filter the plurality of requests by an arbitration gateway based on user attention data gathered from the user monitoring system and a user behavior history. The first controller is further configured to assign a priority to each of the plurality of filtered requests based on a user interest prediction model calculated by the remote system, select at least a portion of the plurality of the filtered requests based on the assigned priority, and display the messages associated with the selected portion of the plurality of the filtered requests on the heads-up display.

In embodiments of the above, the remote controller is further configured to execute instructions to calculate a user prediction model based upon prior behavior gathered from the user monitoring system and data regarding a surrounding environment.

BRIEF DESCRIPTION OF DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of systems, such as in connection with motorcycles, mopeds, locomotives, aircraft, marine craft, and other vehicles, or other automated systems including navigation and mapping functionalities. Systems include, for example, driving navigation, air navigation, marine navigation, robotic navigation, and navigation in enclosed spaces or enclosed geological features, to name a few.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

The present disclosure is directed to an adaptive heads-up display for messages using a user monitoring system and a remote system, such as a cloud service. In aspects, a method and systems are proposed to show messages on a heads-up display adaptively configured in real time according to user is looking determined by the direction of user's eyes or head, leveraging a user monitoring system. Simultaneously, the remote system predictively prioritizes messages using current environmental conditions and accumulated data user behavior exhibited during previous driving events. The combination of real-time and predictive capability prioritizes the messages 108 and eliminates low priority messages 108 for users in an orderly manner, optimizing system resources, reducing distraction, and enhancing outcomes. In aspects, the user is a driver, or other vehicle occupants or remote operator who has authorization to operate the vehicle 100.

Figure 1:
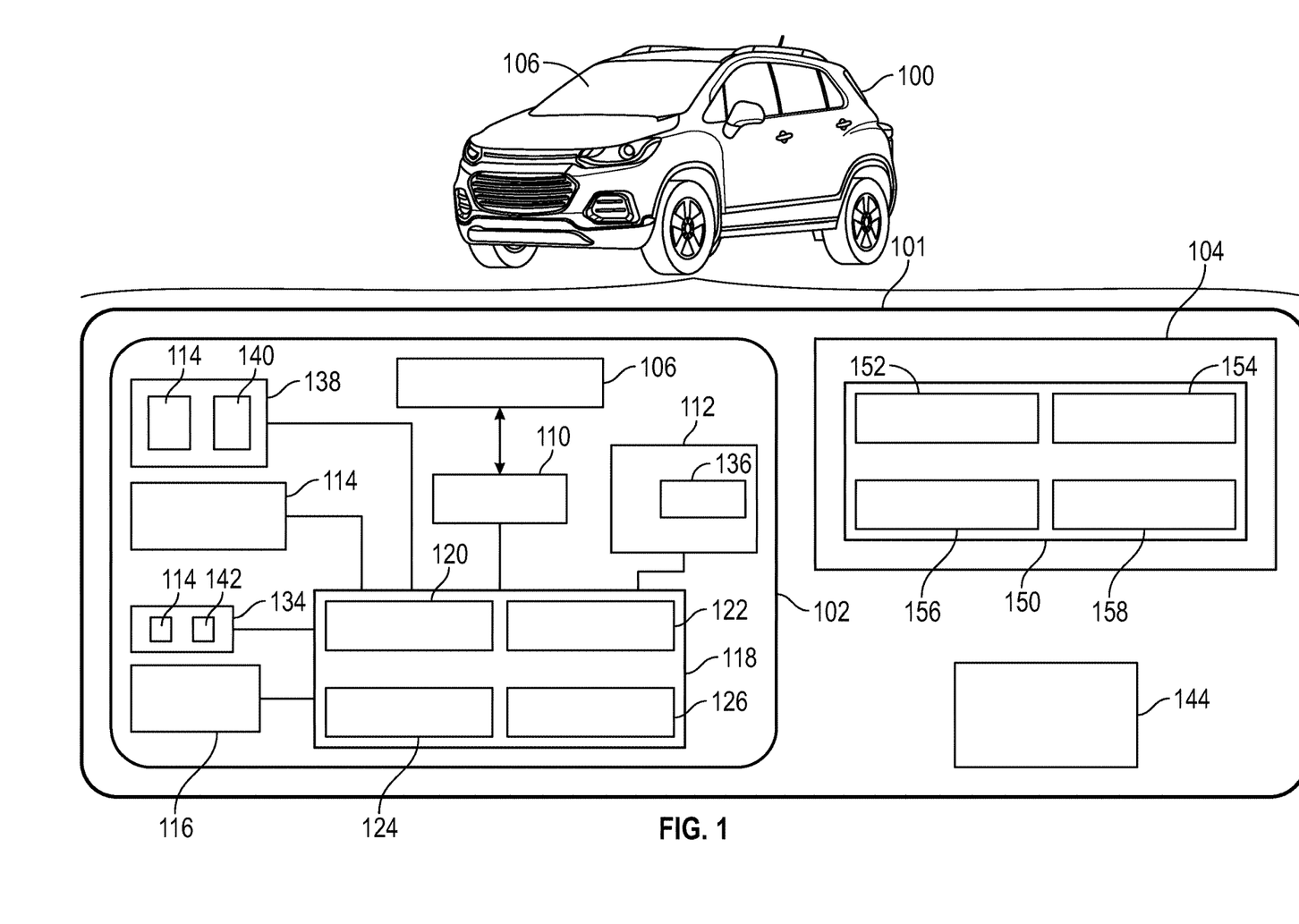
FIG. 1 illustrates an embodiment of a vehicle including a simultaneous localization and mapping system according to various embodiments the present disclosure.

FIG. 1 illustrates a vehicle 100 according to aspects of the present disclosure including an adaptive heads-up display system 101. The adaptive heads-up display system 101 includes both an on-board adaptive heads-up display system 102 and a remote system 104, such as a cloud service. On-board the vehicle 100, the on-board adaptive heads-up display system 102 projects messages 108 (see FIGS. 2A and 2B), such as various images or characters in the form of text or numbers, onto a heads-up display 106. In the illustrated aspect, the heads-up display 106 is visible on the interior of a windshield. In addition, or alternatively, other transparent displays in the user's field of vision may be used. Further, the heads-up display 106 may be an augmented reality heads-up display, where messages 108 are displayed relative to the environment visible through the heads-up display.

The on-board adaptive heads-up display system 102 also includes a projector 110, a user monitoring system 112, user input devices 114, and one or more trip monitoring sensors 116. The various devices, i.e., projector 110, user monitoring system 112, user input devices 114, and one or more trip monitoring sensors 116, are coupled to a controller 118 through one or more wired or wireless connections. The connections provide communication of information in the form of signals, or changes in electrical voltage or current, to and from the various devices in the on-board adaptive heads-up display system 102 and controller 118. The controller 118 includes one or more processors 120, computer readable media 122, a communication system 124 and a buffer 126. As noted above, the adaptive heads-up display system 101 also includes a remote system 104, i.e., cloud services, that delivers predictive information on demand to the vehicle 100. The remote system 104 performs various functions in adapting the messages 108 displayed on the heads-up display 106 using user behavior history and surrounding environmental events.

Figure 2A:
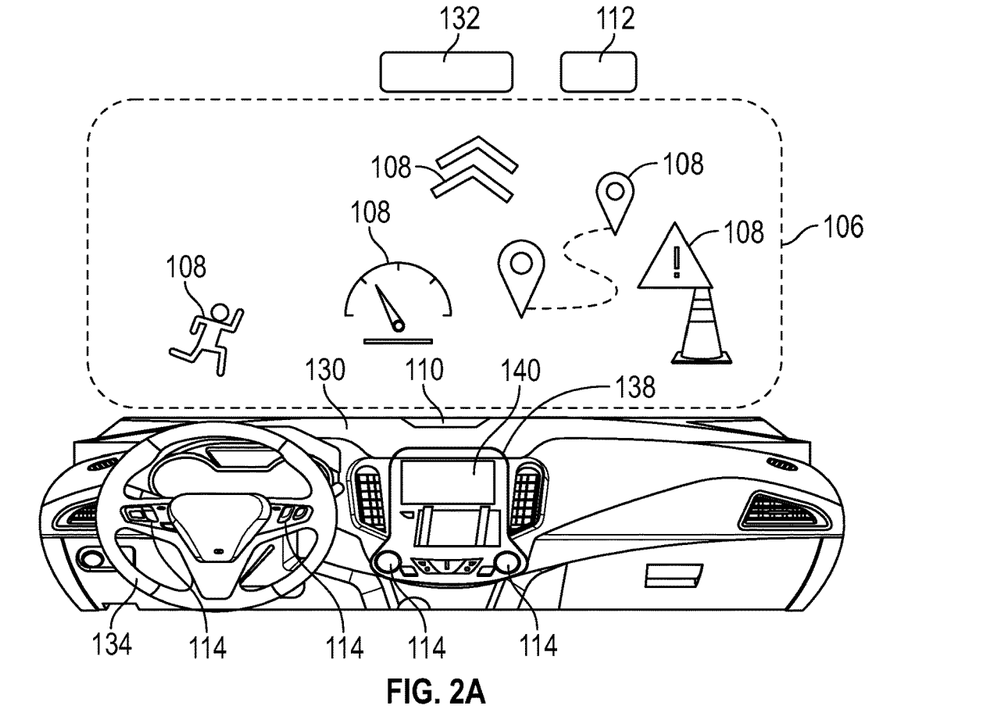
FIG. 2A illustrates an embodiments of various display areas in a vehicle before adaptive configuration of the information displayed on the heads-up display according to various embodiments of the present disclosure.
Figure 2B:
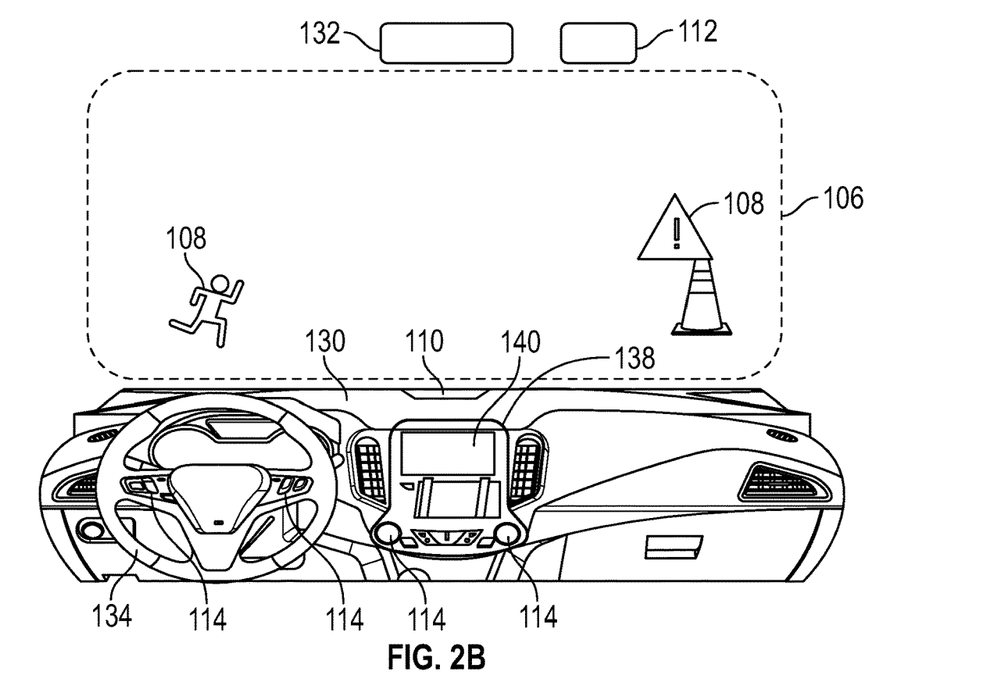
FIG. 2B illustrates an embodiments of various display areas in a vehicle after adaptive configuration of the information displayed on the heads-up display according to embodiments aspects of the present disclosure.

With reference to FIG. 2A and FIG. 2B, the projector 110 is connected to the center top of the dashboard 130. However, it should be appreciated that the projector 110 may alternatively be connected to or integrated into the rearview mirror 132, the roof of the vehicle, or the A-pillars. Further, more than one projector may be provided. The projector 110 may display images across the entire heads-up display 106 or in limited locations on the heads-up display 106. FIG. 2A illustrates a heads-up display 106 including messages 108 represented by various images. The images are not prioritized and represent information having varying degrees of importance to the user. The messages 108 clutter the heads-up display 106, distracting from messages 108 that may be relatively more valuable to the user. FIG. 2B illustrates a heads-up display 106 including a limited number of messages 108. The messages 108 displayed are prioritized, wherein messages 108 that are deemed less important is minimized or omitted altogether, highlighting the importance of the messages 108 that are displayed. The display of particular messages 108 being determined by a combination of user preference, user behavior history, and other characteristics of the information presented in the messages 108.

In addition, a user monitoring system 112 is illustrated in FIG. 1, FIG. 2A and FIG. 2B. The user monitoring system 112 is used to determine where a user, such as the operator or driver, is directing their attention. In embodiments, the user monitoring system 112 includes at least one attention sensor 136, such as a time-of-flight (ToF) sensor and one or more cameras. In further embodiments, the cameras capture visible light or infrared irradiation. While the user monitoring system 112 is illustrated as being positioned near the top of the heads-up display 106, the attention sensor 136 of the user monitoring system 112 may be located in any position that allows measurement of at least one of the user's head position, the user's eye direction, or the user's body. For example, a user monitoring system 112 may be connected to or integrated into the dashboard 130, the rearview mirror 132, an infotainment system 138, or the roof interior. The attention sensor 136 provides user attention data, in the form of a signal, i.e., a change in voltage or current, to the controller 118.

With further reference to FIGS. 2A and 2B, user input devices 114 are provided to allow the user to utilize, manipulate, and control the heads-up display system 101 through user inputs. User input devices 114 include, for example, one or more buttons or sensors in the center console, on the infotainment system 138, and on steering wheel 134. User input devices 114 may also include a microphone, which may be integrated into the steering wheel 134 or the infotainment system 138. In embodiments, the user input devices 114 may be push buttons, knobs, switches, selectors, dials, or toggle buttons. The user input devices 114 include electromechanical or capacitance sensors. In further embodiments the user input devices 114 also provide a haptic response. In embodiments, the infotainment system 138 may include an interactive display 140 including sensors, such as capacitance sensors or resistance sensors for detecting touch. In yet further embodiments, a user may utilize an external communication device 144 for providing input to the controller 118 through the communication system 124. The user input devices 114 are connected to the controller 118, either wired or wirelessly, and allow for the user to configure the messages 108, and the priority of the messages 108 and associated requests from operational applications, displayed on the adaptive heads-up display system 101.

The external communication device 144 may include a smart phone, tablet or computer that communicates to the vehicle 100 wirelessly through one or more wireless communication protocols such as through one or more networks utilizing local area networks using IEEE 802.11 a, b, g, n, p, ac, ax protocols, BLUETOOTH®, cellular networks including 2G, 3G, 4G/LTE, and 5G networks using various communication protocols such as global system for mobile communications (GSM), code division multiple access (CDMA), general packet radio service (GPRS), wideband code division multiple access (W-CDMA), enhanced general packet radio service (E-GPRS), CDMA2000, and universal mobile technology system (UTMS), low power wide-area networks (LPWAN), mobile satellite communications, and combinations thereof.

With reference again to FIG. 1, the trip monitoring sensors 116 provide driving environment perception and includes one or more sensors used to monitor various aspects of the vehicle 100 and the environment surrounding the vehicle 100, particularly while the vehicle 100 is in motion. The trip monitoring sensors 116 include, for example, one or more of the following: one or more visible light cameras, one or more infrared radiation cameras, one or more radars, one or more light detection and ranging (lidar) sensors, one or more odometers, one or more ground penetrating radar (GPR) sensors, one or more ground positioning receivers, one or more steering angle sensors, one or more tire pressure sensors, one or more cameras (e.g., optical cameras and/or thermal cameras, such as a rear camera and/or a front camera), one or more gyroscopes, one or more accelerometers, one or more speed sensors, one or more steering angle sensors, one or more ultrasonic sensors, one or more inertial measurement units (IMUs) and/or other sensors. Each of the trip monitoring sensors 116 are configured to generate a signal, received by the controller 118, that represents information regarding the sensed observable conditions of the environment surrounding the vehicle 100.

As noted above, the controller 118 includes a processor 120. In embodiments, the processor 120 is a custom made or commercially available processor, a central processing unit (CPU), a graphics processing unit (GPU), an auxiliary processor among several processors associated with the on-board adaptive heads-up display system 102, a semiconductor-based microprocessor (in the form of a microchip or chip set), a macroprocessor, a combination thereof, or generally a device for executing instructions. The computer readable media 122, in embodiments, includes volatile and nonvolatile storage in read-only memory (ROM), random-access memory (RAM), and keep-alive memory (KAM), for example. KAM is a persistent or non-volatile memory that may be used to store various operating variables while the processor 120 is powered down. The computer readable media 122 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used in conjunction with the user monitoring system 112 to discern the direction the user is looking or used in conjunction with the trip monitoring sensors 116 to analyze the environment surrounding the vehicle 100.

The controller 118 is programmed to execute instructions for adapting the messages 108 on the heads-up display 106 with the projector 110 using data collected from the user monitoring system 112, the trip monitoring sensors 116, the user input devices 114, and remote system 104. The instructions may include one or more separate programs, each of which comprises an ordered listing of executable instructions for implementing logical functions. The instructions, when executed by the processor 120, receive and process signals from the user monitoring system 112, the trip monitoring sensors 116, the user input devices 114, and remote system 104, performs logic, calculations, methods and/or algorithms. In embodiments, the processor 120 is integrated into the controller 118 as shown in FIG. 1 or separate from the controller 118.

In further embodiments, the user monitoring system 112, includes a processor (not illustrated) for processing image data generated by the attention sensor 136, which sends data regarding the images to the processor 120. In addition, computer readable media (not illustrated) and a buffer may also be provided in the user monitoring system 112. In further embodiments, the infotainment system 138 includes a processor (not illustrated) for processing data received by the user input devices 114 as well as for providing an auxiliary display. In addition, computer readable media (not illustrated) and a buffer may also be provided in the infotainment system 138.

The controller 118 also receives requests to display messages 108 on the adaptive heads-up display system 101 received from various operating applications being executed by the controller 118 or other controllers and processors throughout the vehicle 100. Requests to display messages 108 may also be received by the controller 118 from external communication devices 144. Operational applications are understood as a set of instructions that are designed to carry out a specific task such as, e.g., advanced driver assistance systems, body electronics (vehicle speed, engine rpm, battery charge status, etc.), infotainment systems, autonomous driving systems, telematics systems (including e-call, ONSTAR®, etc.) and power train systems.

The computer readable media 122 stores data for use in making determinations regarding which requests to display messages 108 on the heads-up display 106 should be selected. The computer readable media 122 stores data relating to the user monitoring system 112, the trip monitoring sensors 116, the user input devices 114, and received from the remote system 104. In various embodiments, the computer readable media 122 stores images for comparison to images captured by the attention sensor 136 using the processor 120 or stores messages 108 to display on the heads-up display 106. The computer readable media 122 is non-transitory and can include one or more storage devices, articles of manufacture, or the like. In embodiments, computer readable media 122 include computer system memory, e.g., RAM (random access memory), ROM (read only memory); semiconductor memory, e.g., EPROM (erasable, programmable ROM), EEPROM (electrically erasable, programmable ROM), flash memory; magnetic or optical disks or tapes; and/or the like. The computer readable media 122 may also include computer-to-computer connections, for example, when data is transferred or provided over a network or another communications connection (either wired, wireless, or a combination thereof). Any combination(s) of the above examples is also included within the scope of the computer readable media 122. The computer readable media 122 may be part of the controller 118 or separate from the controller 118.

The computer readable media 122 includes a buffer 126. The buffer 126 is a physical region of computer readable media 122 that is used to temporarily store data between devices such as the processors 120 and the remaining portions of the computer readable media 122 or the processors 120 and the communication system 124. Alternatively, or additionally, the buffer 126 is implemented in an application executed by the processors 120 and the data is stored in a physical region of computer readable media 122. The buffer 126 is used to store, e.g., real-time adaptive data.

The communication system 124 is in communication with the controller 118 and is configured to wirelessly communicate information to and from the remote system 104, such as but not limited to, other vehicles ("V2V" communication), infrastructure ("V2I" communication), remote systems at a remote call center (e.g., ON-STAR by GENERAL MOTORS), and external communication device 144. In certain embodiments, the communication system 124 is a wireless communication system configured to communicate wirelessly through one or more wireless communication protocols such as through one or more networks utilizing local area networks using IEEE 802.11 a, b, g, n, p, ac, ax protocols, BLUETOOTH®, cellular networks including 2G, 3G, 4G/LTE, and 5G networks using various communication protocols such as global system for mobile communications (GSM), code division multiple access (CDMA), general packet radio service (GPRS), wideband code division multiple access (W-CDMA), enhanced general packet radio service (E-GPRS), CDMA2000, and universal mobile technology system (UTMS), low power wide-area networks (LPWAN), mobile satellite communications, and combinations thereof. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 124 may include one or more antennas and/or transceivers for receiving and/or transmitting signals, such as cooperative sensing messages (CSMs).

The remote system 104, including, e.g., cloud services, also includes a controller 150. The controller 150 is connected to a remote processor 152 and remote computer readable media 154 as well as a remote communication system 156. Remote is understood herein to indicate that the remote processor, remote computer readable media, remote communication system, etc. are not located on-board the vehicle 100. In embodiments, the remote processors 152 is a custom made or commercially available processor, a central processing unit (CPU), a graphics processing unit (GPU), an auxiliary processor among several processors associated with the controller 150, a semiconductor-based microprocessor (in the form of a microchip or chip set), a macroprocessor, a combination thereof, or generally a device for executing instructions. The remote computer readable media 154, in embodiments, includes volatile and nonvolatile storage in read-only memory (ROM), random-access memory (RAM), and keep-alive memory (KAM), for example. KAM is a persistent or non-volatile memory that may be used to store various operating variables while the remote processor 152 is powered down. The remote computer readable media 154 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 150 in controlling the vehicle 100. The controller 150 is programmed to execute instructions for adapting messages 108 by predicting user interest in certain messages 108, using data previously collected by the user monitoring system 112, and events occurring in the surrounding environment.

Again, the instructions may include one or more separate applications, each of which comprises an ordered listing of executable instructions for implementing logical functions. The instructions, when executed by the remote processor 152, receive and process signals from the user monitoring system 112, user input devices 114, and trip monitoring sensors 116, perform logic, calculations, methods and/or algorithms for displaying on the heads-up display the adapted information, forwarded by the communication system 124 in the controller 118. The remote system controller 150 also receives information regarding user behavior history to make predictions regarding the information the user may be interested in seeing displayed on the heads-up display 106.

The remote computer readable media 154 stores data related to the surrounding environment and the user behavior history. The remote computer readable media 154 is non-transitory and can include one or more storage devices, articles of manufacture, or the like. In embodiments, remote computer readable media 154 includes computer system memory, e.g., RAM (random access memory), ROM (read only memory); semiconductor memory, e.g., EPROM (erasable, programmable ROM), EEPROM (electrically erasable, programmable ROM), flash memory; magnetic or optical disks or tapes; and/or the like. The remote computer readable media 154 may also include computer-to-computer connections, for example, when data is transferred or provided over a network or another communications connection (either wired, wireless, or a combination thereof). Any combination(s) of the above examples is also included within the scope of the remote computer readable media 154. The remote computer readable media 154 may be part of the controller 150 or separate from the controller 150.

The remote computer readable media 154 includes a remote buffer 158. The buffer is a physical region of remote computer readable media 154 that is used to temporarily store data between devices such as the between the remote processor 152 and the remainder of the remote computer readable media 154 or between the remote processor 152 and remote communication system 156. Alternatively, or additionally, the remote buffer 158 is implemented in an application executed by the remote processor 152 and the data is stored in a physical region of remote computer readable media 154. The remote buffer 158 is used to store the predictive data as determined by the remote processor 152.

The remote communication system 156 is in communication with the remote controller 150 and is configured to wirelessly communicate information to and from the controller 118 in the on-board adaptive heads-up display system 102 of the vehicle 100 and external communication devices 144. In certain embodiments, the remote communication system 156 is a wireless communication system configured to communicate wirelessly through one or more wireless communication protocols such as through one or more networks utilizing local area networks using IEEE 802.11 a, b, g, n, p, ac, ax protocols, BLUETOOTH®, cellular networks including 2G, 3G, 4G/LTE, and 5G networks using various communication protocols such as global system for mobile communications (GSM), code division multiple access (CDMA), general packet radio service (GPRS), wideband code division multiple access (W-CDMA), enhanced general packet radio service (E-GPRS), CDMA2000, and universal mobile technology system (UTMS), low power wide-area networks (LPWAN), mobile satellite communications, and combinations thereof. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the remote communication system 156 may include one or more antennas and/or transceivers for receiving and/or transmitting signals, such as cooperative sensing messages (CSMs). The remote communication system 156 is configured to wirelessly communicate information between the vehicle 100 and another vehicle. Further, the remote communication system 156 is configured to wirelessly communicate information between the remote system 104 and infrastructure or other vehicles.

Figure 3:
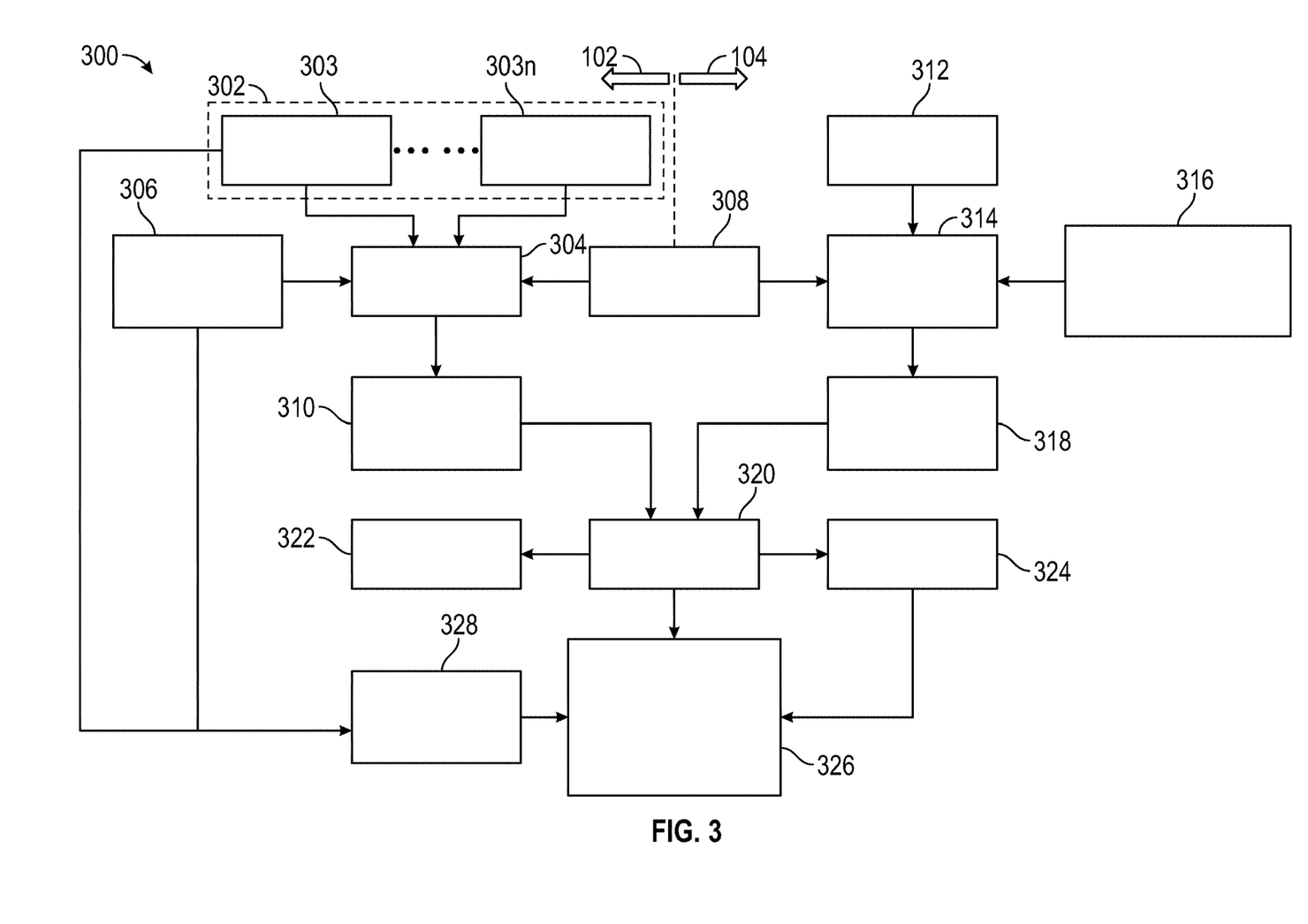
FIG. 3 illustrates a flowchart of a method of adaptive configuring information displayed on a heads-up display according to various embodiments of the present disclosure.

FIG. 3, with references to FIGS. 1, 2A, and 2B, illustrates a method 300 for the adaption of the messages 108 displayed on the heads-up display 106 of a vehicle 100 by determining which requests from operational applications should be selected for display. The method utilizes two simultaneous processes, one on-board the vehicle 100 using the on-board adaptive heads-up display system 102 and the other using the remote system 104. The method 300 or parts thereof may be implemented in a computer program product embodied in the computer readable media 122 found on-board the vehicle as well as in the remote computer readable media 154 and includes instructions usable, or executable, by the processor 120 of the controller 118 on-board the vehicle 100 and in the remote processor 152 of the remote controller 150 in the remote system 104 across which processing and data storage may take place. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one computer or on multiple computers in communication with one another. It is therefore to be understood that the method 300 may be at least partially performed by any electronic articles and/or devices capable of carrying out instructions corresponding to one or more steps of the method 300. The method 300 is repeated, wherein the repetition is based on a selected time period such as once every 0.01 seconds to once every 1 second or triggered by a request by an operational application to display a message 108 on the heads-up display 106.

On board the vehicle 100, the method 300 begins at block 302 when the controller 118 receives a number of requests 303 through 303n from one or more operational applications to display a message 108 on the heads-up display 106. Again, the operational applications may include, e.g., advanced driver assistance systems, body electronics (vehicle speed, engine rpm, battery charge status, etc.), infotainment systems, autonomous driving systems, telematics systems (including e-call, ONSTAR®, etc.) and power train systems. At block 304 the requests are received by an arbitration gateway, which is embodied by instructions executed by the processor 120 associated with the controller 118. The arbitration gateway receives the requests to display one or more messages 108, prioritizes the requests to display the message 108 associated with each request, and filters the requests and associated messages 108 that are low-priority, conflicted, or out-of-scope of the user's interest. In embodiments, the filtered requests may be dropped and not displayed on the heads-up display 106. The arbitration gateway performs these functions through the execution of instructions by the processor 120 using, e.g., the steps illustrated in method 400 illustrated in FIG. 4.

Figure 4:
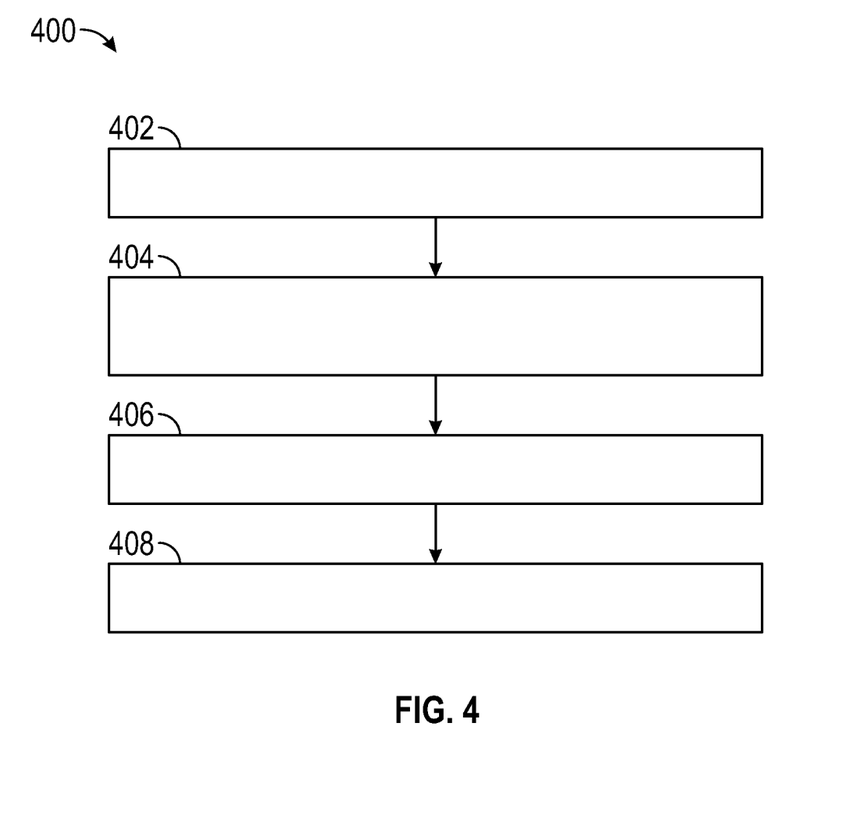
FIG. 4 illustrates a flowchart of a method used by the arbitration gateway for prioritizing and buffering real-time adaptive and customized data according to various embodiments of the present disclosure.

Referring now to FIG. 4, at block 402 the arbitration gateway checks the ID of a request received. The ID is understood as a signifier that provides identifying information regarding the request, which is allocated by the controller 118. The output of block 402 is a first tuple (a set of ordered elements) for each request, the first tuple including the following elements: the ID, the priority, heads-up display attributes, and raw data. The priority may be normalized and ranked on a scale of greater than zero and up to and including one, wherein the higher priority the lower the ranking. In embodiments, heads-up display attributes include the format of the messages 108 to be displayed, including the location the messages 108 should be projected on the heads-up display 106, the format of the messages 108 such as the shape of the icon or characters, the color of the messages 108, whether the messages 108 is solid or blinking, etc. The configuration of heads-up display attributes is performed during user preference configuration, wherein the user configures the heads-up display attributes using the user input devices 114. User preference configuration may occur upon initialization of the on-board adaptive heads-up display system 102, such as before the user's first trip operating the vehicle 100, after the vehicle 100 is first turned on, or after the vehicle 100 is switched from a demo mode to a standard mode. Finally, the raw data is the data providing the basis of the request. In embodiments, the raw data may include the vehicle speed, the tachometer reading, the name of a song playing on the infotainment system, the name of a road that is being traversed by the vehicle 100, an overlay image representing a particular hazard, etc. The data is converted into the messages 108 displayed.

At block 404, the arbitration gateway, as executed by instructions with the processor 120, is used to determine which messages 108 are to be displayed on the heads-up display 106 based on real-time information and user behavior history. The arbitration gateway polls various the operating applications to extract emergency attributes and safety related data from the different applications and then further categorizes the information from the first tuple. Again, in embodiments, the emergency level may be normalized on a scale of greater than zero and up to and including one, wherein the lower value indicates a greater urgency to display the messages 108 on the heads-up display 106. A second tuple is defined for each request including the following elements: the ID, the priority, emergency level, heads-up display attributes, and raw data.

At block 406 a third tuple is derived for each request including the following elements: the ID, the priority, emergency level, user attention status, heads-up display attributes, and raw data. The user attention status is derived from the user attention data from the user monitoring system 112 at block 306 of FIG. 3 and indicates the eye and head location of the user. The user monitoring system 112 may collect data, continuously repeating at given intervals of time or upon the request of the arbitration gateway. If the user's focus is far from the location of the where the messages 108 are displayed, or a specific message 108 is displayed, on the heads-up display 106, a normalized user attention status is calculated and in embodiments, is ranked on a scale of greater than zero and up to and including one, wherein the lower the number the more focus the user has on the location of the messages 108 in the heads-up display 106.

At block 408, the user behavior history, of the heads-up display 106 is referenced at block 308 of FIG. 3 to further augment the third data tuple to create a fourth data tuple which includes the following elements: the ID, the priority, emergency level, user attention status, user behavior history, heads-up display attributes, and raw data. For example, if the user has aggressive driving behavior such as relatively high acceleration times, relatively high average steering wheel changing ratio, relatively high jerk ratio, etc., or relatively high confidence in their driving skills without depending on, e.g., advanced driver assistance systems such as electronic stability control, adaptive cruise control, or lane departure warning, the data generated from active safety operational applications may not be as useful to the user. Thus, the fourth tuple, a filtering tuple, includes a user interest factor that quantifies the level of interest of the user in the data. In embodiments, the user interest is normalized on a scale of greater than zero and up to and including one, wherein a value closer to zero represents more interest the user has shown in the data. Information regarding the user behavior history may be updated continuously at given intervals or updated upon request by the arbitration gateway.

With reference again to FIG. 3, using the filtering tuple in the arbitration gateway at block 304, the requests for displaying messages 108 are filtered and a buffer of real-time adaptive and customized messages 108 requested by the various operational applications is created at block 310. The buffer 126 of messages 108 for display is maintained in, for example, the computer readable media 122.

While the controller 118 executes instructions in the onboard adaptive heads-up display system 102, the remote system 104 proceeds at block 312. Block 312 is a service pool, stored on e.g., the computer readable media 154, where programs and models are saved and ready to be used. For example, loading the map data, pre-trained models, pre-defined user behavior models (generalized information with statistical information and prior knowledge) and previously requested ID's for displaying messages 108 on the heads up display 106. At block 314 a user interest prediction model is executed by the remote controller 150. The user interest prediction model polls data regarding the user behavior history collected at block 308. In addition, the user interest prediction model also polls data collected at block 316 regarding the surrounding environment. This data includes, weather data, speed limits, work zone locations, and accident information. The data may further include mapping information.

The user interest prediction model executed by the controller 150 at block 314 is, in embodiments, a multi-category regression model, which predicts the level of interest of a user in messages 108 received from various operational applications at block 302 at different traffic events. For example, based on prior behavior gathered from the user monitoring system 112 at block 306 it may be understood that a user has more interest in traffic lights and work zone detours due to behavior exhibited when the user previously approached traffic lights and work zone detours. The output of the user prediction model is a fifth, prioritizing tuple including the following data: event_ID, priority, emergency level, predictive user interest, heads-up display attributes, lead time, raw event data. The event_ID is understood as an identifier for a particular event that occurred in the past at a particular location and is allocated by the controller 150. The priority may be ranked on a scale of greater than zero and up to and including one, wherein the higher priority the lower the ranking, the emergency level may also be normalized on a scale of on a scale of greater than zero and up to and including one and determined based upon the historical data used in the arbitration gateway at block 304. Similarly, the predictive user interest may also be normalized on a scale of greater than zero and up to and including one based on data gathered from the user monitoring system 112 at block 306. Heads-up display attributes include the user preference configuration or an altered user preference configuration such as previous changes to the configuration of the format of the messages 108 that occurred during previous driving events. Lead time is the amount of time messages 108 should be shown on the heads-up display before an event occurs, such as arriving at an intersection, arriving at an upcoming accident, etc., and may take into account the vehicle speed, etc. Finally, the raw data is the data that provides the basis of the request. In embodiments, the raw data may include the vehicle speed, the tachometer reading, the name of a song playing on the infotainment system, the name of a road that is being traversed by the vehicle 100, etc. The output of the user interest prediction model at block 314 is saved in a remote buffer 158 at block 318.

At block 320 the predictive data, i.e., stored in a remote buffer 158 at block 318, and the real-time adaptive data, stored in buffer 126 at block 310 are combined using a prioritization procedure to create a prioritizing score and assign a priority to each request to display a message 108. The data may be combined in either the controller 118 or in the remote controller 150. The prioritization procedure executed at block 320 weights the data provided in the fourth tuple and the fifth tuple. In embodiments, the final prioritization score is the sum of a) a product of the ID, the priority, emergency level, user attention status, user behavior history of the fourth tuple is weighted by a factor w and b) the product of the event_ID, priority, emergency level, predictive user interest of the fifth tuple is weighted by a factor (1−w). The default value for w is, in embodiments, e.g., 0.7. The smaller the value of the product, the relatively higher priority level the request to display a message 108 on the heads-up display 106 has. If the score is higher than a threshold prioritization level, e.g., 0.5, the request and associated message 108 are considered a low priority request. The request and associated message 108 will be dropped and not displayed on the heads-up display 106. If it is determined that a dropped request and associated message 108 is safety related, feedback may be provided to the user using at least one of sound emitted by the infotainment system 138 and a haptic response created by one or more vibration motors 142 (see FIG. 1) in the steering wheel 134 at block 322. However, if the user specifically raises the priority of the dropped request and associated message 108, then the message 108 will be displayed on the heads-up display 106.

At block 326, the associated messages 108 of requests assigned the highest priority, for example, the top three or four, are then displayed on the heads-up display 106 using adaptive color and status based configured by the user using the user input devices 114 at block 328. The user preference learning model at block 328 is calculated from the data received by the user monitoring system 112 and the user preference configuration. As noted above, the user preference configuration may be configured upon initialization of the on-board adaptive heads-up display system 102, such as before the users first trip using the vehicle 100 after the vehicle 100 is turned on, or after the vehicle 100 is switched from a demo mode to a standard mode.

In embodiments, a number of parameters may be learned, rather than being predefined based upon field testing or the use of a shadow system where user behavior is being recorded by the user monitoring system 112 whether the vehicle 100 is being used in an autonomous mode, a semi-autonomous mode, or a manual mode. These parameters include the weight factor w, the threshold prioritization level, the number of highest priority requests displayed on the heads-up display 106, the weights and relationships used to determine the user interest factor and the predictive user interest factor, as well as the lead time, which may be altered according to, e.g., an ongoing situation.

Several advantages are offered by the adaptive heads-up display described herein, including prioritizing information of interest to the user exercising control over the vehicle. An additional advantage includes the reduction of distraction by minimizing information displayed on the heads-up display, such as by omitting information deemed to be of less importance to the user. A further advantage includes the relative optimization and maximization of resources for user. Yet a further advantage is that data calculated by the user interest prediction model may be transferred between users displaying similar user behavior history.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of adaptively controlling messages displayed on a heads-up display, comprising:
   receiving a plurality of requests to display a message associated with each of the plurality of requests on a heads-up display from one or more operational applications;
   filtering the plurality of requests by an arbitration gateway based on user attention data gathered from a user monitoring system and a user behavior history, wherein filtering includes calculating a filtering tuple for each of the plurality of requests by characterizing each of the plurality of requests according to the following elements: an ID, a priority, an emergency level, a user attention status, the user behavior history, a heads-up display attribute, and raw data;
   assigning a priority to each of the plurality of filtered requests based on a user interest prediction model;
   selecting at least a portion of the plurality of the filtered requests based on the assigned priority; and displaying the messages associated with the selected portion of the plurality of filtered requests on the heads-up display.

2. The method of claim 1, further comprising dropping the message associated with at least one of the plurality of filtered requests that was not selected based on the assigned priority.

3. The method of claim 2, further comprising displaying the dropped message associated with at least one of the plurality of filtered requests on the heads-up display that was not selected based on the assigned priority.

4. The method of claim 2, further comprising providing at least one of a sound and a haptic response when the dropped message is related to safety.

5. The method of claim 1, further comprising gathering user attention data using an attention sensor, wherein the attention sensor includes at least one of a time-of-flight sensor and a camera.

6. The method of claim 1, further comprising calculating the user interest prediction model based upon a surrounding environmental event and the user behavior history.

7. The method of claim 1, further comprising assigning the priority of each of the plurality of filtered requests by weighting the filtering tuple for each of the plurality of filtered requests; weighting a prioritizing tuple for each of the plurality of filtered requests; and adding the weighted filtering tuple and the weighted prioritizing tuple.

8. The method of claim 7, further comprising calculating the prioritizing tuple by characterizing each of the plurality of requests according to the following elements: an event_ID, a priority, an emergency level, a predictive user interest, a heads-up display attribute, a lead time, and raw event data.

9. The method of claim 1, wherein displaying the messages further comprises displaying the messages using adaptive color and status configured by the user using a user input device.

10. The method of claim 1, wherein the raw data includes at least one of a vehicle speed, tachometer reading, a name of a song playing on an infotainment system, a name of the road being traversed by the vehicle, and an overlay image representing a particular hazard.

11. The method of claim 1, wherein the user attention status is derived from the user attention data from the user monitoring system which indicates an eye and head location of the user, wherein a normalized user attention status is calculated and the user's focus is ranked based on the focus the user has on the location of the messages in the heads-up display.

12. An on-board adaptive heads-up display system for a vehicle, comprising:
a first controller;
a heads-up display connected the first controller; and
a user monitoring system connected to the first controller;
wherein the first controller is configured to execute instructions to:
receive a plurality of requests to display a message associated with each of the plurality of requests on a heads-up display from one or more operational applications;
filter the plurality of requests by an arbitration gateway based on user attention data gathered from the user monitoring system and a user behavior history, by using a filtering tuple to characterize each of the plurality of requests by the arbitration gateway including the following elements: an ID, a priority, an emergency level, a user attention status, the user behavior history, a heads-up display attribute, and raw data;
assign a priority to each of the plurality of filtered requests based on a user interest prediction model;
select at least a portion of the plurality of the filtered requests based on the assigned priority; and
display the messages associated with the selected portion of the plurality of the filtered requests on the heads-up display.

13. The on-board adaptive heads-up display system for a vehicle of claim 12, wherein the controller is further configured to execute instructions to drop the message associated with the at least one of the plurality of filtered requests that was not selected based on the assigned priority.

14. The on-board adaptive heads-up display system for a vehicle of claim 13, wherein the controller is further configured to execute instructions to provide at least one of a sound and a haptic response when the dropped message is related to safety.

15. The on-board adaptive heads-up display system for a vehicle of claim 12, wherein the controller is further configured to execute instructions to gather user attention data using an attention sensor, wherein the attention sensor includes at least one of a time-of-flight sensor and a camera.

16. The on-board adaptive heads-up display system for a vehicle of claim 15, wherein the controller is further configured to execute instructions to configure a heads-up display attribute of the messages using user inputs received from a user input device.

17. The on-board adaptive heads-up display system for a vehicle of claim 12, wherein controller is further configured to execute instructions to assign a priority to the plurality of filtered requests by weighting the filtering tuple for each of the plurality of filtered requests; weighting a prioritizing tuple based on the user interest prediction model; and adding the weighted filtering tuple and the weighted prioritizing tuple to calculate a prioritizing score.

18. The on-board adaptive heads-up display system for a vehicle of claim 17, wherein controller is further configured to execute instructions to calculate the prioritizing tuple by characterizing each of the plurality of filtered requests according to the following elements: an event_ID, a priority, an emergency level, a predictive user interest, a heads-up display attribute, a lead time, and raw event data.

19. An adaptive heads-up display system for a vehicle, comprising:
an on-board adaptive heads-up display system including a first controller, a heads-up display connected the first controller, a user monitoring system connected to the first controller, and a first communication system connected to the first controller; and
a remote system including a remote controller and a remote communication system connected to the remote controller, wherein the remote controller is configured to wirelessly communicate information to the first communication system,
wherein the first controller is configured to execute instructions to:
receive a plurality of requests to display a message associated with each of the plurality of requests on a heads-up display from one or more operational applications;
filter the plurality of requests by an arbitration gateway based on user attention data gathered from the user monitoring system and a user behavior history, by using a filtering tuple to characterize each of the plurality of requests by the arbitration gateway including the following elements: an ID, a priority, an emergency level, a user attention status, the user behavior history, a heads-up display attributes, and raw data;

assign a priority to each of the plurality of filtered requests based on a user interest prediction model calculated by the remote system;

select at least a portion of the plurality of the filtered requests based on the assigned priority; and display the messages associated with the selected portion of the plurality of the filtered requests on the heads-up display.

20. The adaptive heads-up display system for a vehicle of claim 19, wherein the remote controller is configured to execute instructions to: calculate a user prediction model based upon prior behavior gathered from the user monitoring system and data regarding a surrounding environment.

* * * * *